US012566524B2

(12) United States Patent
Shinohara et al.

(10) Patent No.: US 12,566,524 B2
(45) Date of Patent: Mar. 3, 2026

(54) INPUT DEVICE

(71) Applicant: OMRON Corporation, Kyoto (JP)

(72) Inventors: Masayuki Shinohara, Nagaokakyo (JP); Yasuhiro Tanoue, Kyoto (JP); Norikazu Kitamura, Osaka (JP); Hiroyuki Miyamoto, Yasu (JP); Yuto Mori, Joyo (JP)

(73) Assignee: OMRON CORPORATION, Kyoto (JP)

( * ) Notice: Subject to any disclaimer, the term of this patent is extended or adjusted under 35 U.S.C. 154(b) by 195 days.

(21) Appl. No.: 17/283,252

(22) PCT Filed: Sep. 18, 2019

(86) PCT No.: PCT/JP2019/036502
§ 371 (c)(1),
(2) Date: Apr. 7, 2021

(87) PCT Pub. No.: WO2020/075456
PCT Pub. Date: Apr. 16, 2020

(65) Prior Publication Data

US 2021/0342030 A1 Nov. 4, 2021

(30) Foreign Application Priority Data

Oct. 11, 2018 (JP) ................................ 2018-192777

(51) Int. Cl.
*G06F 3/042* (2006.01)
*G06F 3/01* (2006.01)

(52) U.S. Cl.
CPC ............ *G06F 3/0421* (2013.01); *G06F 3/011* (2013.01); *G06F 3/017* (2013.01)

(58) Field of Classification Search
None
See application file for complete search history.

(56) References Cited

U.S. PATENT DOCUMENTS 9,740,381 B1 * 8/2017 Chaudhri .............. G06F 3/0485
10,275,098 B1 * 4/2019 Clements ............... G02B 30/56
(Continued)

FOREIGN PATENT DOCUMENTS

CN 102141877 A 8/2011
CN 107111150 A 8/2017
(Continued)

OTHER PUBLICATIONS

The International Search Report of International Application No. PCT/JP2019/036502 issued on Nov. 12, 2019.
(Continued)

*Primary Examiner* — Parul H Gupta
(74) *Attorney, Agent, or Firm* — SHINJYU GLOBAL IP

(57) ABSTRACT

An input device includes a light source, a light guide plate, a sensor, and a controller. The light guide plate guides light from a light source to form an image in a space. The sensor detects an object in the space including an imaging position of the image. Based on an output from the sensor, the controller acquires at least one of a trajectory of a plurality of positions where the object is detected, a duration time of detecting the object, or a number of times the object is detected as an input parameter. The controller identifies an input pattern according to a movement of the object based on the input parameter, and outputs a signal corresponding to the identified input pattern.

16 Claims, 17 Drawing Sheets

(56) References Cited

U.S. PATENT DOCUMENTS

| | | | | |
|---|---|---|---|---|
| 10,339,721 | B1 * | 7/2019 | Dascola | G06F 3/011 |
| 2005/0264527 | A1 * | 12/2005 | Lin | G06F 3/011 345/156 |
| 2009/0193361 | A1 * | 7/2009 | Lee | G06F 3/04886 715/810 |
| 2011/0191707 | A1 * | 8/2011 | Lee | G03H 1/2294 359/9 |
| 2012/0026416 | A1 * | 2/2012 | Kim | G02B 30/25 359/465 |
| 2013/0061176 | A1 * | 3/2013 | Takehiro | G06F 1/1626 715/823 |
| 2013/0227482 | A1 * | 8/2013 | Thorsander | G06F 3/04886 715/810 |
| 2015/0169096 | A1 * | 6/2015 | Nishizawa | G06F 3/017 345/173 |
| 2017/0371493 | A1 * | 12/2017 | Kitamura | G06F 3/0421 |
| 2018/0091728 | A1 * | 3/2018 | Brown | H04N 23/62 |
| 2018/0101087 | A1 | 4/2018 | Shinohara | |
| 2018/0210551 | A1 | 7/2018 | Kitagawa | |
| 2019/0235643 | A1 | 8/2019 | Kuribayashi | |
| 2020/0142548 | A1 * | 5/2020 | Karunamuni | G06F 3/04883 |
| 2021/0337180 | A1 | 10/2021 | Hirose et al. | |

FOREIGN PATENT DOCUMENTS

| | | | |
|---|---|---|---|
| JP | 2011-159273 | A | 8/2011 |
| JP | 2012-209076 | A | 10/2012 |
| JP | 2015-115038 | A | 6/2015 |
| JP | 2016-130832 | A | 7/2016 |
| JP | 2016-184895 | A | 10/2016 |
| JP | 2017-027401 | A | 2/2017 |
| JP | 2018-97388 | A | 6/2018 |
| JP | 2018-151556 | A | 9/2018 |
| WO | 2016/170804 | A1 | 10/2016 |
| WO | 2017/146172 | A1 | 8/2017 |
| WO | 2018/003862 | A1 | 1/2018 |

OTHER PUBLICATIONS

The Written Opinion of the International Searching Authority of International Application No. PCT/JP2019/036502 issued on Nov. 12, 2019.

The Office Action for the corresponding Japanese application No. 2019-188035, issued on Sep. 12, 2023.

The Office Action for the corresponding Japanese application No. 2019-188035, issued on Nov. 28, 2023.

The Office Action for the corresponding Chinese application No. 201980064789.8 issued on Apr. 1, 2025.

The Office Action for the corresponding Chinese application No. 201980064789.8 issued on Aug. 8, 2024.

The Office Action for the corresponding German application No. 112019005069.9 issued on Sep. 1, 2025.

* cited by examiner

INPUT DEVICE

CROSS-REFERENCE TO RELATED APPLICATION

This application is the U.S. National Phase of International Application No. PCT/JP2019/036502, filed on Sep. 18, 2019. This application claims priority to Japanese Patent Application No. 2018-192777, filed Oct. 11, 2018. The contents of those applications are incorporated by reference herein in their entireties.

FIELD

The present invention relates to an input device.

BACKGROUND

Conventionally, there is known an input device that emits light from a light guide plate to form an image in a space and detects an object in the space including an imaging position of the image (see, for example, Japanese Laid-open Patent Application Publication No. 2012-209076). According to such a device, the user can perform an input operation by virtually touching an image such as a button displayed in the air in the space.

SUMMARY

The input device according to Patent Document 1 described above can handle simple input operations such as on/off operations, but it is difficult to handle complicated input operations.

An object of the present invention is to provide an input device capable of handling a complicated input operation.

An input device according to one aspect includes a light source, a light guide plate, a sensor, and a controller. The light guide plate guides light from the light source to form an image in a space. The sensor detects an object in the space that includes an imaging position of the image. Based on an output from the sensor, the controller acquires, as an input parameter, at least one of a trajectory of a plurality of positions where the object is detected, a duration time of detecting the object, or a number of times the object is detected. The controller identifies an input pattern according to a movement of the object based on the input parameter, and outputs a signal corresponding to the identified input pattern.

In the input device according to the present aspect, the controller identifies the input pattern based on at least one of the trajectory of the plurality of positions where the object is detected, the duration time of detecting the object, or the number of times the object is detected. Therefore, not only simple input operations such as on/off operations but also complicated input operations can be identified.

The controller may change the image depending on the identified input pattern. In this case, the image changes according to the input operation of a user. Therefore, the user can easily grasp that the input device recognizes his/her own input operation.

The controller may acquire the trajectory of the plurality of positions where the object is detected as the input parameter. The controller may identify a moving direction of the object from the trajectory of the plurality of positions where the object is detected. The input pattern may include the moving direction of the object. In this case, the controller can identify the input pattern according to the movement direction of the user's finger, for example.

The sensor may detect the object at least at a reference detection point in the image, a first detection point located above the reference detection point, and a second detection point located below the reference detection point. In this case, the controller can identify, for example, a vertical movement of the user's finger as the input pattern.

The sensor may detect the object at least at a reference detection point in the image, a third detection point located leftward of the reference detection point, and a fourth detection point located rightward of the reference detection point. In this case, the controller can identify, for example, a movement of the user's finger in the left-right direction as the input pattern.

The controller may move the image in a direction corresponding to the moving direction of the object. In this case, the image changes according to the direction of the user's input operation. Therefore, the user can easily grasp that the input device recognizes his/her own input operation.

The controller may acquire the duration time of detecting the object as the input parameter. The controller may identify the input pattern according to the duration time. The controller may output the signal according to the duration time. In this case, the controller can identify the input pattern according to the duration time of the input operation by the user.

The controller may change the image depending on the duration time. In this case, the image changes according to the duration time of the user's input operation. Therefore, the user can easily grasp that the input device recognizes his/her own input operation.

The controller may identify between a normal press operation and a long press operation according to the duration time. In this case, it is possible to identify between the normal press operation and the long press operation, not limited to a simple input operation such as an on/off operation. The controller may acquire the number of times the object is detected within a predetermined time. The controller may output the signal according to the number of times the object is detected within the predetermined time. In this case, the controller can identify the input pattern according to the number of times of input operations by the user.

The controller may change the image according to the number of times the object is detected within the predetermined time. In this case, the image changes according to the number of times of input operations of the user. Therefore, the user can easily grasp that the input device recognizes his/her own input operation.

The controller may identify between a single click and a double click depending on the number of times the object is detected within the predetermined time. In this case, not only a simple input operation such as an on/off operation but also the single click and the double click can be identified.

The sensor may include a photoelectric sensor. In this case, the object can be easily detected in the space.

The controller may output the signal having a plurality of command values according to the input pattern. In this case, the input device can output the signal of a plurality of command values according to the input operation of the user to an external device.

The input device may further include a plurality of signal lines configured to output the signal to the outside of the input device. The controller may selectively output the signal from a plurality of signal lines according to the input pattern. In this case, the input device can selectively output the signal from the plurality of signal lines to an external device according to the input operation of the user.

DETAILED DESCRIPTION

Figure 1:
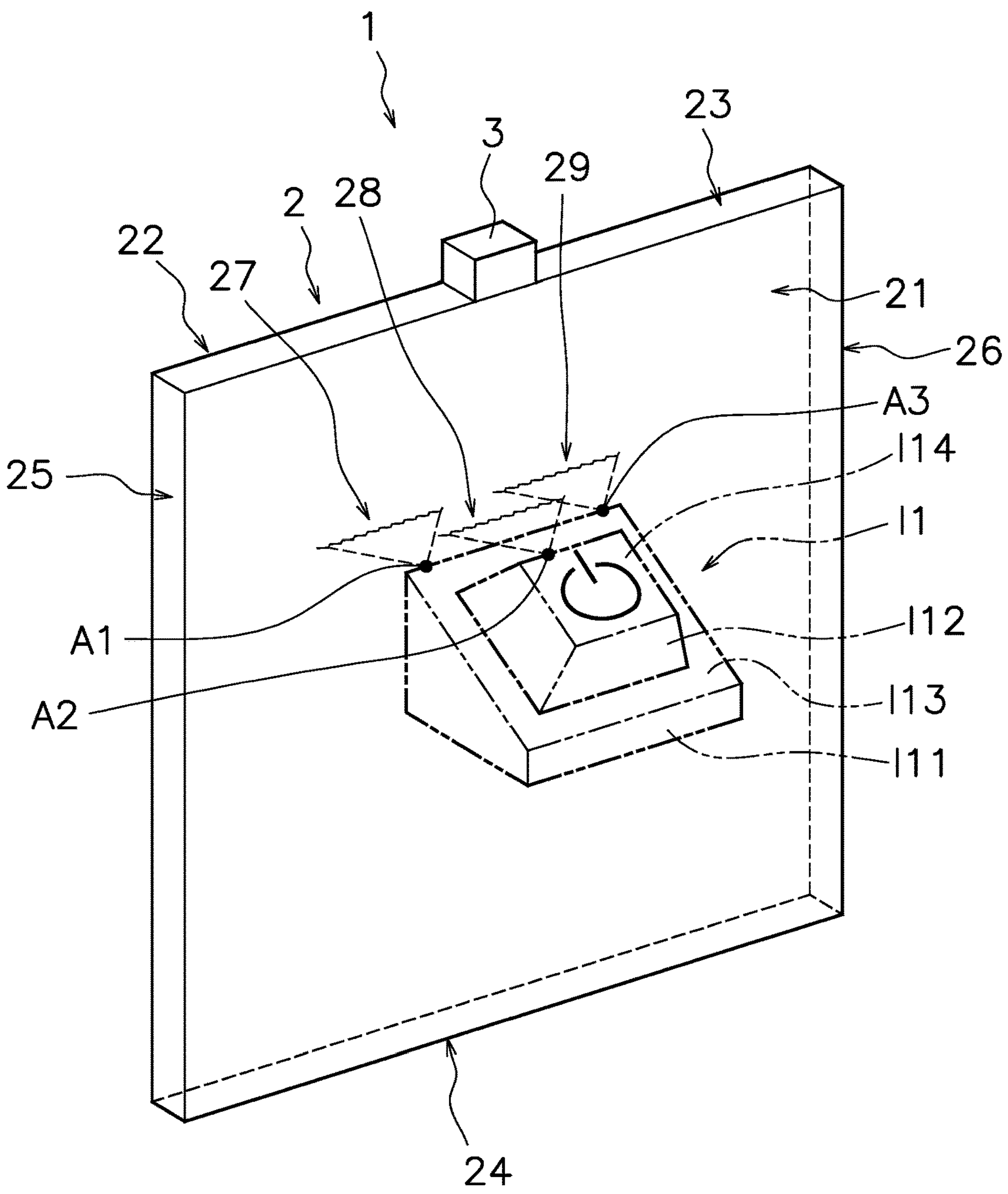
FIG. 1 is a perspective view of an input device according to a first embodiment.
Figure 2:
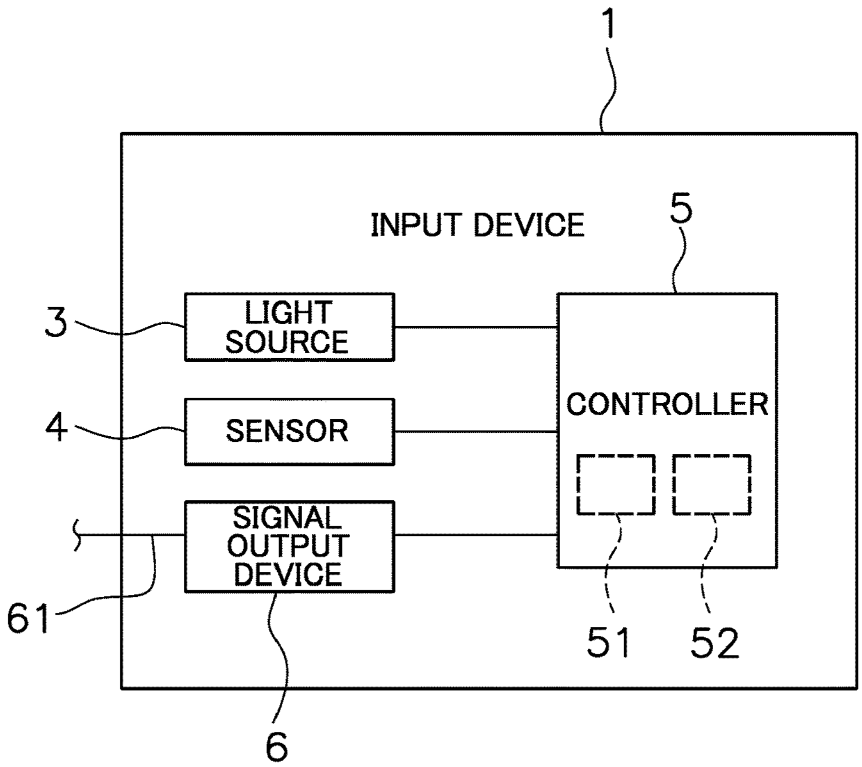
FIG. 2 is a block diagram showing a structure of the input device.

Hereinafter, an input device 1 according to an embodiment will be described with reference to the drawings. FIG. 1 is a perspective view of the input device 1 according to a first embodiment. FIG. 2 is a block diagram showing a configuration of the input device 1 according to the first embodiment. The input device 1 includes a light guide plate 2, a light source 3, a sensor 4, a controller 5, and a signal output device 6.

The light guide plate 2 guides light from the light source 3 to form an image I1 in a space. As a result, the light guide plate 2 projects the image I1 visually recognized by a user into the space without a screen. The light guide plate 2 is made of a translucent material. The light guide plate 2 is made of, for example, a transparent resin such as polymethylmethacrylate (PMMA), polycarbonate, or a cycloolefin polymer, or a material such as glass.

The light guide plate 2 includes an emitting surface 21, a back surface 22, and end surfaces 23 to 26. The emitting surface 21 emits the light from the light source 3. The back surface 22 is located on the opposite side of the emitting surface 21. The light from the light source 3 is incident on the end surface 23. The light from the light source 3 may be incident on the other end surfaces 24 to 26. The light source 3 is, for example, an LED (Light Emitting Diode). However, the light source 3 is not limited to the LED, and may be another light source such as an OLED (Organic Light Emitting Diode). In FIG. 1, the light guide plate 2 is arranged so that the emitting surface 21 is parallel to the vertical direction. However, the light guide plate 2 may be arranged so that the emitting surface 21 forms a predetermined angle not including 0 degrees with respect to the vertical direction.

The light guide plate 2 includes a plurality of light guide portions. The plurality of light guide portions are provided corresponding to a plurality of prescribed points included in the image I1. For example, the plurality of light guide portions include a first light guide portion 27, a second light guide portion 28, and a third light guide portion 29. The first light guide portion 27 corresponds to a first prescribed point A1 included in the image I1. The second light guide portion 28 corresponds to a second prescribed point A2 included in the image I1. The third light guide portion 29 corresponds to a third prescribed point A3 included in the image I1.

Figure 3:
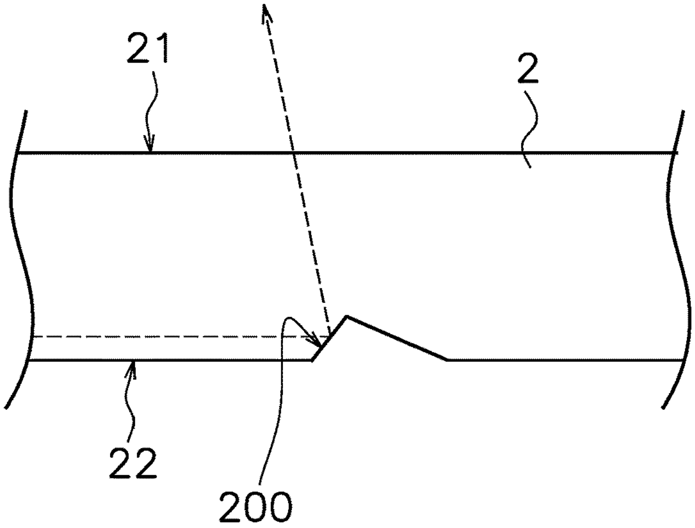
FIG. 3 is sectional view of a light guide plate showing an example of a prism.
Figure 4A:
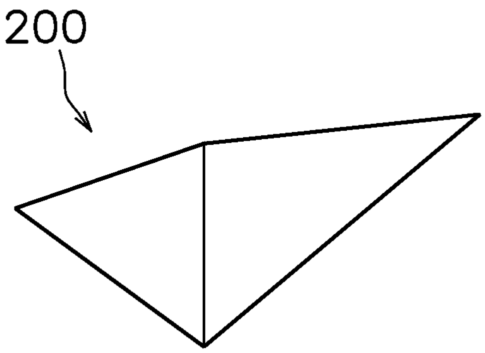
FIGS. 4A, 4B, and 4C are perspective views of an example of a shape of the prism.
Figure 4B:
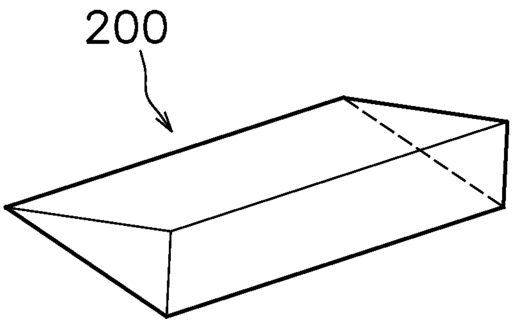
Figure 4C:
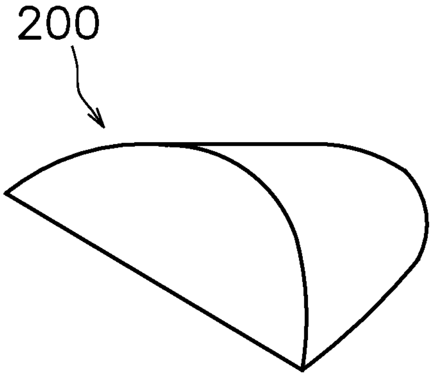

Each of the light guide portions includes a plurality of prisms. FIG. 3 is a cross-sectional view of the light guide plate 2 showing an example of the prism 200. FIGS. 4A, 4B and 4C are perspective views showing an example of the shape of the prism 200. The prism 200 is provided on the back surface 22 of the light guide plate 2. The prism 200 is formed by a dimple recessed from the back surface 22 of the light guide plate 2. As illustrated in FIG. 4A, the prism 200 has, for example, the shape of a triangular pyramid. Alternatively, the prism 200 may have the shape of a triangular pole, as illustrated in FIG. 4B. Alternatively, as illustrated in FIG. 4C, the prism 200 may have a curved surface shape. The plurality of prisms 200 are arranged so that the light from the light source 3 is reflected toward the emitting surface 21 of the light guide plate 2 and the light converges at the prescribed point corresponding to each of the light guide portions.

For example, the light incident on the first light guide portion 27 is reflected by the plurality of prisms 200 included in the first light guide portion 27 so as to converge on the first prescribed point A1. As a result, the wave surface of the light from the first light guide portion 27 becomes the wave surface of the light emitted from the first prescribed point A1. Similarly, the light incident on the second light guide portion 28 is reflected by the plurality of prisms 200 included in the second light guide portion 28 so as to converge on the second prescribed point A2. The light incident on the third light guide portion 29 is reflected by the plurality of prisms 200 included in the third light guide portion 29 so as to converge on the third prescribed point A3.

In this way, the light from the light source 3 is reflected by the plurality of light guide portions, so that the light converges at the plurality of prescribed points corresponding to each of the plurality of light guide portions. As a result, the wave surface of the light is formed in which the light is emitted from the plurality of prescribed points. The image I1 recognized by the user is formed in the space by a collection of the light converged at the plurality of prescribed points.

As illustrated in FIG. 1, in the first embodiment, the image I1 is a stereoscopic image showing the shape of the input member operated by the operator. In this embodiment, the image I1 shows the shape of a pushbutton switch. The image I1 includes a base portion Ill and a button portion 112. The base portion Ill has a shape protruding toward the emitting surface 21 of the light guide plate 2. The button portion 112 is arranged on the base portion Ill and shows a shape protruding from the base portion Ill.

The base portion Ill includes a support surface 113. The support surface 113 is inclined with respect to the emitting surface 21. The button portion 112 includes a pressing surface 114. The pressing surface 114 is inclined with respect to the emitting surface 21. However, the support surface 113 and the pressing surface 114 may be parallel to the emitting surface 21. Alternatively, the support surface 113 and the pressing surface 114 may be perpendicular to the emitting surface 21. As will be described later, the image I1 is not limited to the pushbutton, and may be a switch of another type. Alternatively, the image I1 is not limited to the switch and may be another input member.

Figure 5:
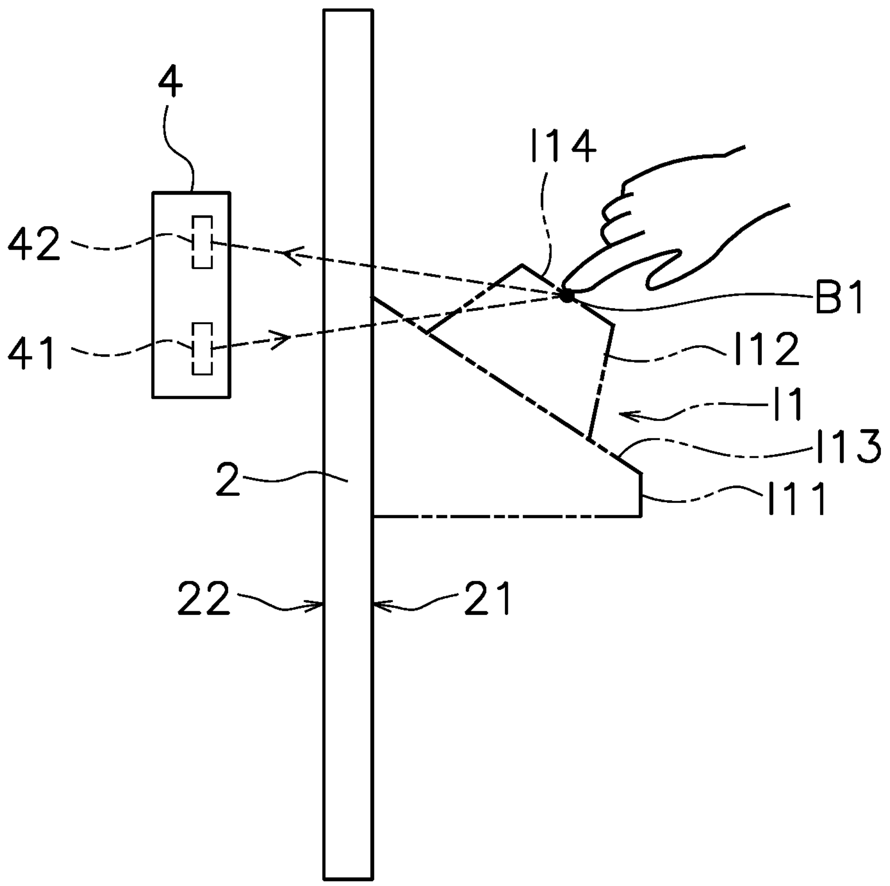
FIG. 5 is a side view of a structure and arrangement of a sensor.

The sensor 4 is a proximity sensor that detects an object in a non-contact manner. The sensor 4 detects an object in the space including the imaging position of the image I1. FIG. 5 is a side view showing the configuration and arrangement of the sensor 4. As illustrated in FIG. 5, the sensor 4 is arranged on the back surface 22 side of the light guide plate 2. The sensor 4 is, for example, a photoelectric sensor. The sensor 4 includes a light emitting element 41 and a light receiving element 42. The light emitting element 41 irradiates light toward the emitting surface 21 of the light guide plate 2. The light receiving element 42 receives the light from the light emitting element 41 reflected by the object. The sensor 4 outputs a signal indicating the detection result to the controller 5. The light emitting element 41 and the light receiving element 42 may be separately provided as separate units.

In this embodiment, the sensor 4 is a limited reflection sensor. The limited reflection sensor detects that there is an object at a predetermined detection position B1. The predetermined detection position B1 includes the imaging position of the image I1. For example, the predetermined detection position B1 is included in the button portion 112 of the image I1. Specifically, the predetermined detection position B1 is included in the pressing surface 114 of the button portion 112. Therefore, the sensor 4 detects that the user's finger is at the position of the button portion 112. As a result, the sensor 4 detects the input operation of the user's finger to the button portion 112.

The sensor 4 is not limited to the limited reflection sensor, and may be another photoelectric sensor such as a TOF (time of flight) type. Alternatively, the sensor 4 is not limited to the photoelectric sensor, and may detect an object via other media such as radio waves, magnetic fields, or heat.

The signal output device 6 outputs a signal in response to a command from the controller 5 via a signal line 61. The signal line 61 is connected to an external device. The signal output device 6 includes, for example, an analog output circuit. However, the signal output device 6 may include a digital output circuit. The signal from the signal output device 6 has a command value. The command value is, for example, a voltage value. However, the command value may be a current value.

The controller 5 includes a processor 51 such as a CPU (Central Processing Unit) and a memory 52 such as a RAM (Random Access Memory) and a ROM (Read Only Memory). The memory 52 stores computer commands executed by the processor 51 and data for controlling the input device 1. The controller 5 controls the light source 3 and the signal output device 6. The controller 5 receives the detection signal from the sensor 4.

In the present embodiment, the controller 5 acquires a duration time of detecting the object as an input parameter based on the output from the sensor 4. The controller 5 identifies an input pattern according to the movement of the object based on the input parameter. That is, the controller 5 identifies the input pattern according to the duration time.

Specifically, the controller 5 identifies the input pattern depending on whether the duration time is greater than or equal to a threshold value. The input pattern includes a normal press operation and a long press operation. When the duration time is less than the threshold value, the controller 5 identifies that the input pattern is the normal push operation. When the duration time is equal to or longer than the threshold value, the controller 5 identifies that the input pattern is the long press operation.

The controller 5 outputs a signal corresponding to the identified input pattern. For example, the controller 5 turns off the signal from the signal output device 6 when no object is detected. When the input pattern is the normal pressing operation, the controller 5 outputs a signal of the first command value from the signal output device 6. When the input pattern is the long press operation, the controller 5 outputs a signal of the second command value from the signal output device 6. The first command value is a value corresponding to the normal push operation. The second command value is a value corresponding to the long press operation and is different from the first command value. The controller 5 may output a signal having a command value that continuously increases or decreases as the duration time increases.

Figure 6A:
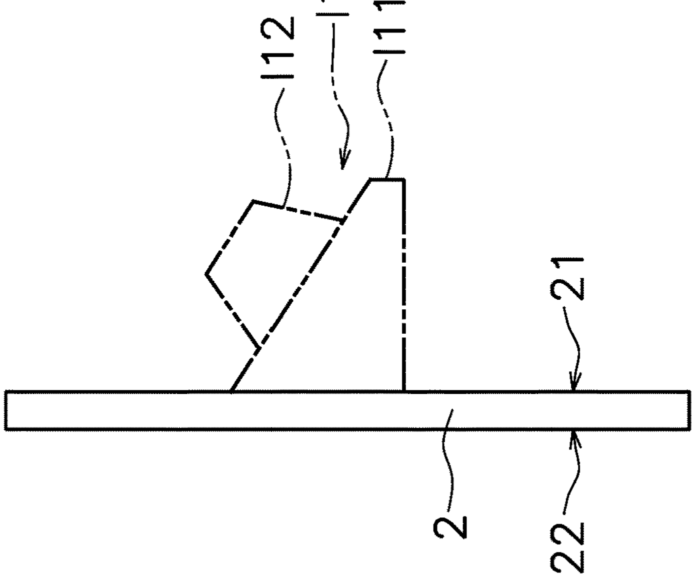
FIGS. 6A, 6B, and 6C are diagrams showing an example of a change of an image according to an input pattern.
Figure 6B:
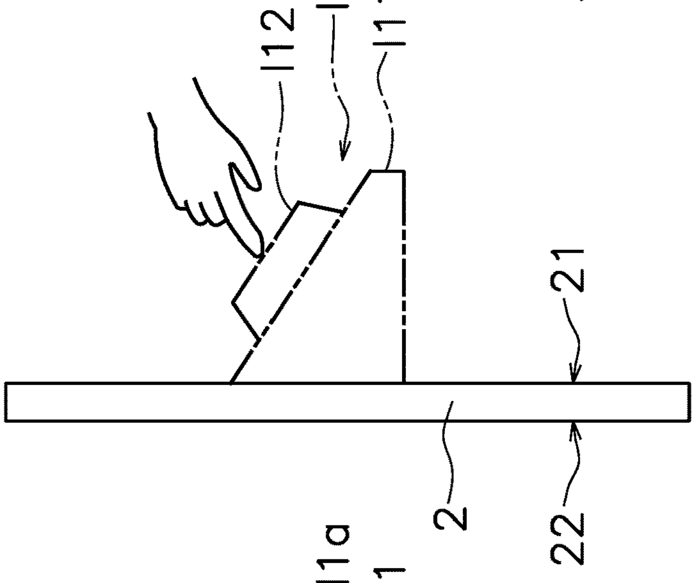
Figure 6C:
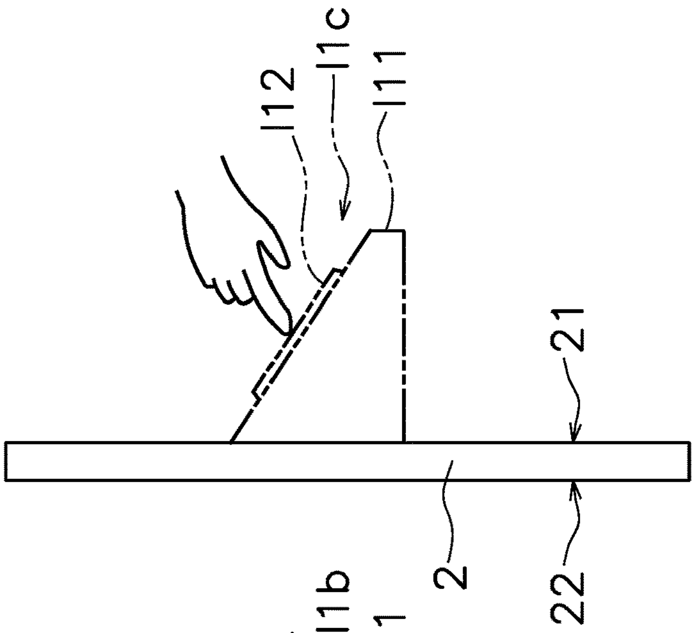

As illustrated in FIGS. 6A, 6B and 6C, the controller 5 changes the image I1 according to the identified input pattern. For example, when no input operation is performed, the controller 5 displays a first image I1*a* illustrated in FIG. 6A. The first image I1*a* is an image corresponding to no operation. When the normal pressing operation is performed, the controller 5 displays a second image I1*b* illustrated in FIG. 6B. The second image I1*b* is an image corresponding to the normal pressing operation. In the second image I1*b*, the amount of protrusion of the button portion 112 from the base portion Ill is smaller than that in the first image I1*a*. When the long press operation is performed, the controller 5 displays a third image I1*c* illustrated in FIG. 6C. The third image I1*c* is an image corresponding to the long press operation. In the third image I1*c*, the amount of protrusion of the button portion 112 from the base portion Ill is smaller than that in the second image I1*b*.

For example, the input device 1 may include a plurality of light sources corresponding to the first to third images I1*a* to I1*c*. Alternatively, the input device 1 may include a plurality of light sources and a plurality of light guide plates corresponding to the first to third images I1*a* to I1*c*. The controller 5 may switch the display of the first to third images I1*a* to I1*c* by selectively turning on the plurality of light sources.

In the input device 1 according to the first embodiment described above, the controller 5 identifies the input pattern according to the operation of the object based on the duration time of detecting the object. Therefore, it is possible to identify between the normal press operation and the long press operation, not limited to a simple input operation such as an on/off operation. Further, the sensor 4 may be any one that detects an object in the space including the imaging position of the image I1. Therefore, the input device 1 can be realized at low cost.

The controller 5 changes the image I1 according to the duration time. Therefore, the image I1 changes depending on whether the user's input operation is the normal press operation or the long press operation. Therefore, the user can easily grasp whether the input device 1 recognizes his/her own input operation as the normal pressing operation or the long pressing operation.

Next, the input device 1 according to a second embodiment will be described. The configuration of the input device 1 according to the second embodiment is the same as that of the input device 1 according to the first embodiment. In the input device 1 according to the second embodiment, the controller 5 acquires a number of times an object is detected within a predetermined time as the input parameter based on the output from the sensor 4. The controller 5 identifies the input pattern according to the movement of the object based on the input parameter, and outputs a signal corresponding to the identified input pattern.

Specifically, the controller 5 acquires the number of times the button is pressed by the user within a predetermined time. The predetermined time is, for example, a short time of 1 second or less. However, the predetermined time may be 1 second or longer. The input patterns include a single click and a double click. The controller 5 identifies the input pattern according to the number of times the button is pressed within the predetermined time. When the number of times the button is pressed within the predetermined time is one, the controller 5 identifies that the input pattern is the single click. When the number of times the button is pressed within the predetermined time is two, the controller 5 identifies that the input pattern is the double click. The controller 5 may identify that the input pattern is the double click when the number of times the button is pressed within the predetermined time is two or more. Alternatively, when the number of times the button is pressed within the predetermined time is 3 times or more, the controller 5 may identify the input pattern as the input operation of the number of clicks of 3 times or more.

The controller 5 outputs a signal corresponding to the identified input pattern. The controller 5 turns off the signal from the signal output device 6 when no object is detected. When the input pattern is the single click, the controller 5 outputs a signal of the first command value from the signal output device 6. When the input pattern is the double click, the controller 5 outputs a signal of the second command value from the signal output device 6. The first command value is a value corresponding to the single click. The second command value is a value corresponding to the double click and is different from the first command value.

Figure 7A:
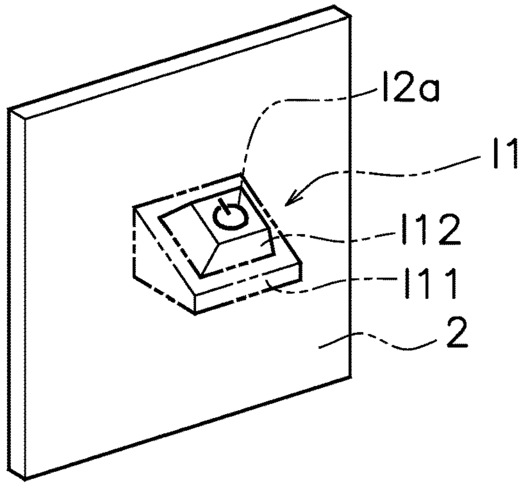
FIGS. 7A, 7B, and 7C are diagrams showing an example of the change of the image according to the input pattern.
Figure 7B:
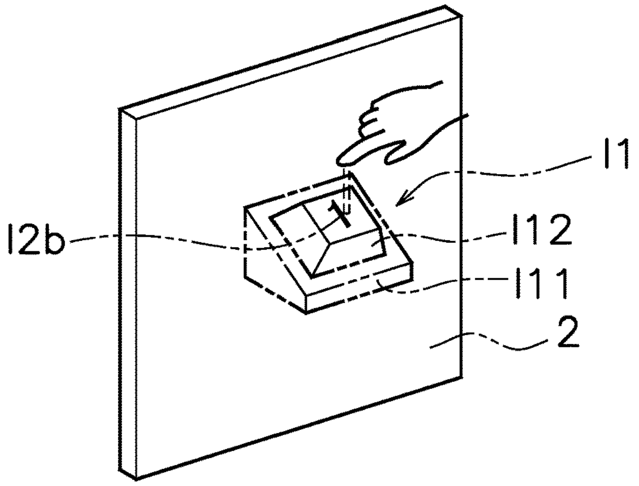
Figure 7C:
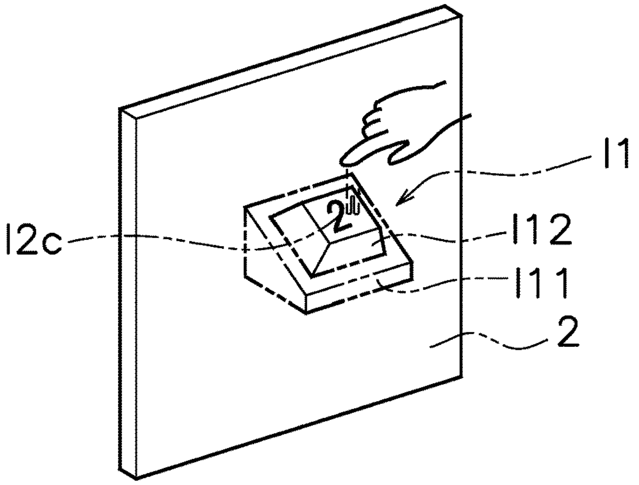

The controller 5 changes the image I1 according to the input pattern. That is, the controller 5 changes the image I1 according to the number of times of detections. For example, when no input operation is performed, the controller 5 displays a first image I2*a* illustrated in FIG. 7A. The first image I2*a* is an image corresponding to no operation. When the input pattern is the single click, the controller 5 displays a second image I2*b* illustrated in FIG. 7B. The second image I2*b* is an image corresponding to the single click. When the input pattern is the double click, the controller 5 displays a third image I2*c* illustrated in FIG. 7C. The third image I2*c* is an image corresponding to the double click. The first to third images I2*a* to I2*c* are displayed on, for example, the button portion 112. However, the first to third images I2*a* to I2*c* may be displayed at other positions.

For example, the input device 1 may include a plurality of light sources corresponding to the first to third images I2*a* to I2*c*. Alternatively, the input device 1 may include a plurality of light sources and a plurality of light guide plates corresponding to the first to third images I2*a* to I2*c*. The controller 5 may switch the display of the first to third images I2*a* to I2*c* by selectively turning on the plurality of light sources.

In the input device 1 according to the second embodiment described above, the controller 5 acquires the number of times the object is detected within the predetermined time. The controller 5 outputs a signal according to the number of times of detections. Therefore, the controller 5 can identify input operations such as the single click and the double click by the user.

The controller 5 changes the image I1 according to the number of times of detections. Therefore, the image I1 changes according to the number of times of input operations of the user. Therefore, the user can easily grasp that the input device 1 recognizes his/her own input operation.

Figure 8:
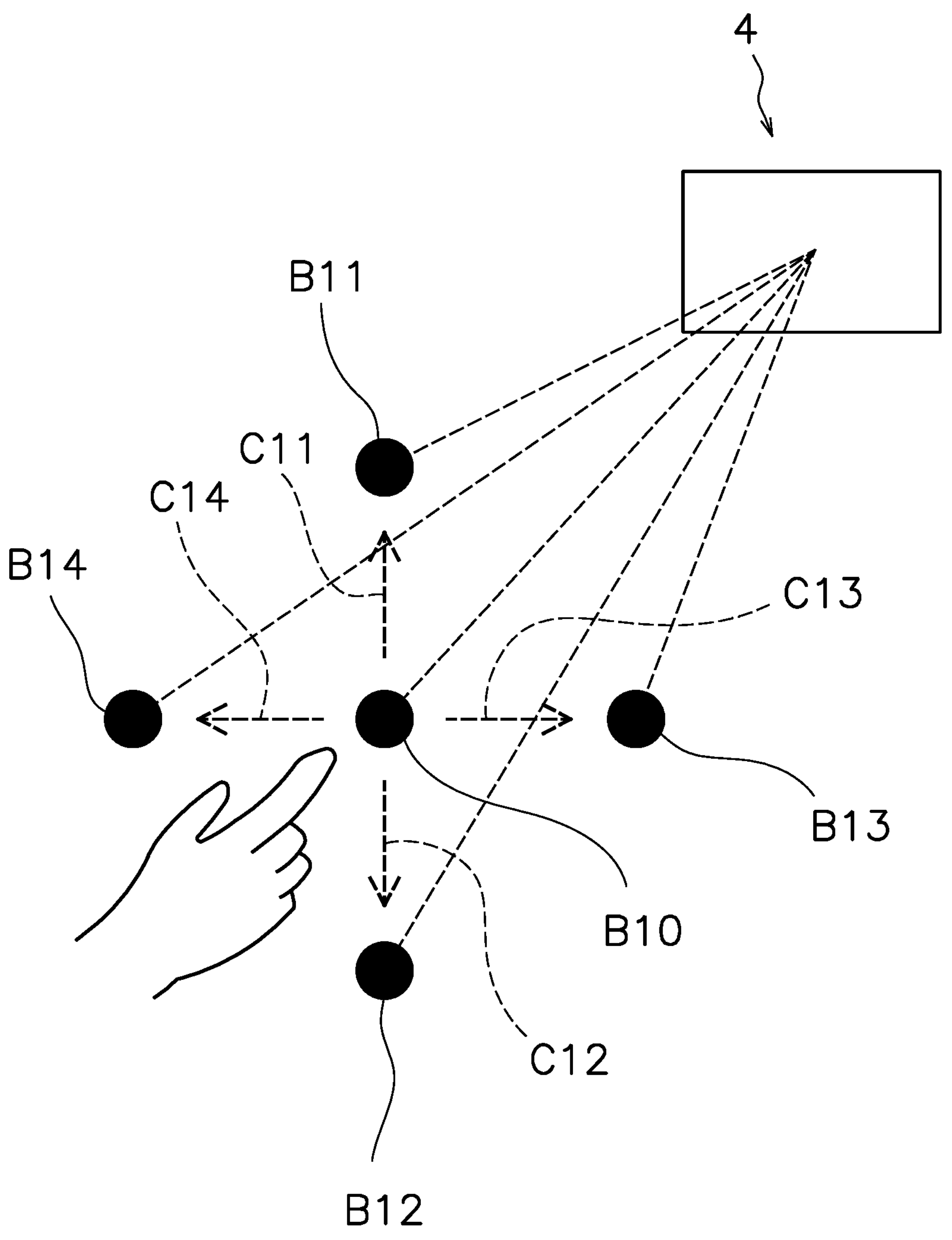
FIG. 8 is a diagram showing an example of detection points by the sensor.

Next, the input device 1 according to a third embodiment will be described. As illustrated in FIG. 8, in the input device 1 according to the third embodiment, the sensor 4 detects an object at a plurality of detection points included in a space in which the image is formed. Specifically, the sensor 4 detects an object at a reference detection point B10, a first detection point B11, a second detection point B12, a third detection point B13, and a fourth detection point B14. The reference detection point B10 is located in the image displayed by the light guide plate 2. The first detection point B11 is located above the reference detection point B10. The second detection point B12 is located below the reference detection point B10. The third detection point B13 is located leftward of the reference detection point B10. The fourth detection point B14 is located rightward of the reference detection point B10. The vertical direction may be the front-back direction for the user.

Figure 9:
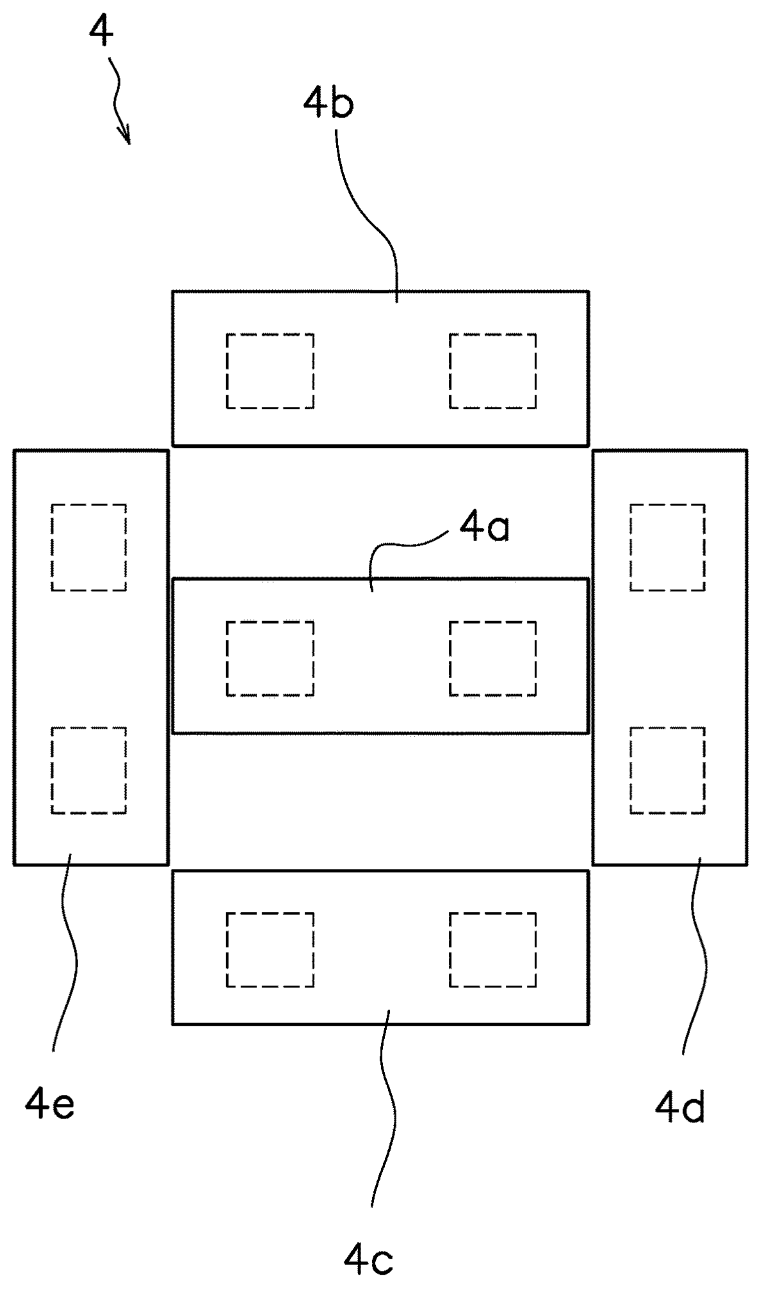
FIG. 9 is a diagram showing an example of the structure of the sensor.

As illustrated in FIG. 9, the sensor 4 includes, for example, a plurality of proximity sensors 4*a* to 4*e*. The proximity sensors 4*a* to 4*e* have the same configurations as the sensor 4 of the first embodiment. The plurality of proximity sensors 4*a* to 4*e* correspond to the plurality of detection points B10 to B14 described above. Specifically, the plurality of proximity sensors 4*a* to 4*e* include a reference sensor 4*a*, a first sensor 4*b*, a second sensor 4*c*, a third sensor 4*d*, and a fourth sensor 4*e*. The reference sensor 4*a* detects an object at the reference detection point B10. The first sensor 4*b* detects an object at the first detection point B11. The second sensor 4*c* detects an object at the second detection point B12. The third sensor 4*d* detects an object at the third detection point B13. The fourth sensor 4*e* detects an object at the fourth detection point B14.

Figure 10:
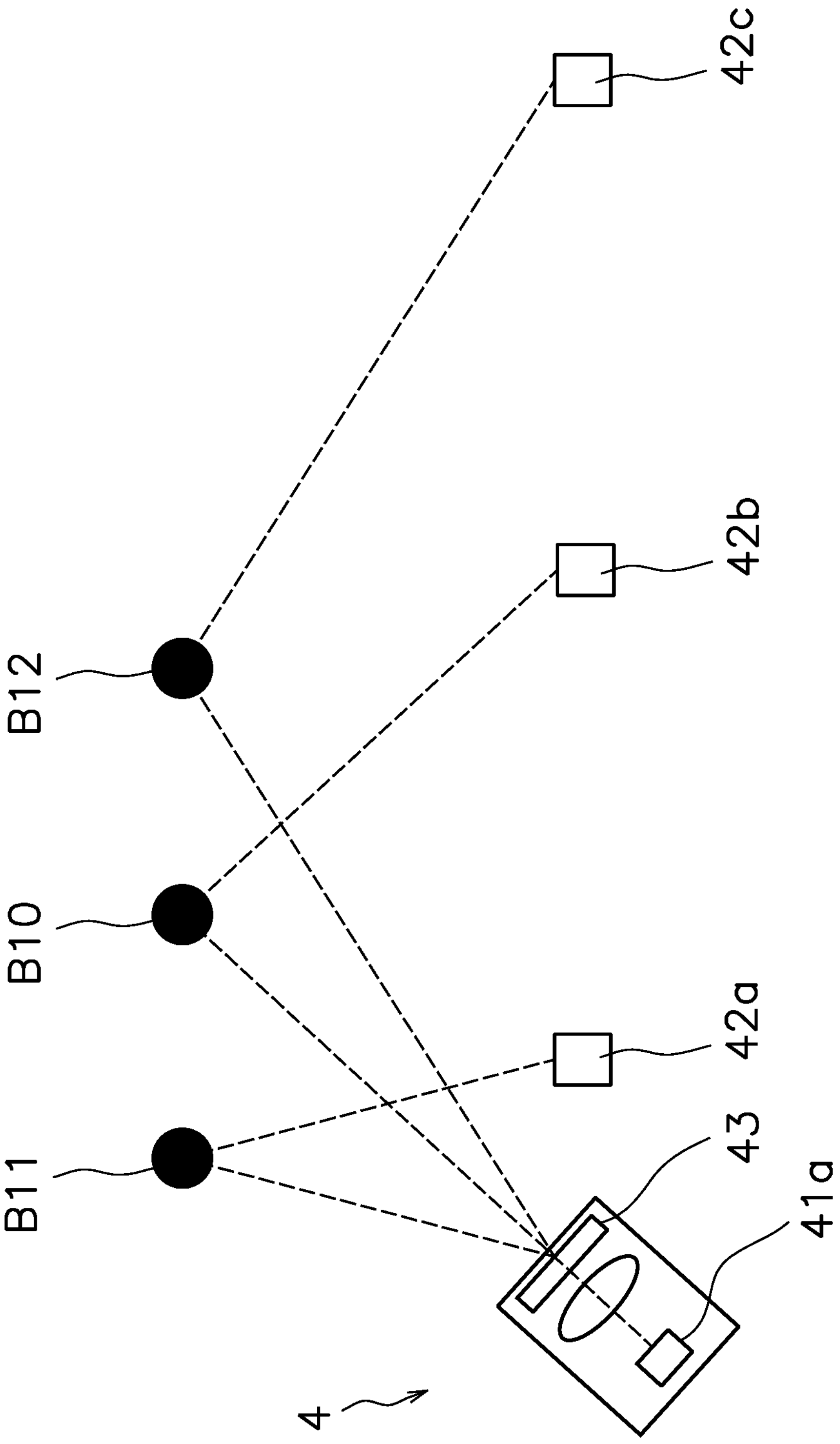
FIG. 10 is a diagram showing another example of the structure of the sensor.

However, in the sensor 4, the plurality of proximity sensors may not be provided on a one-to-one basis with respect to the plurality of detection points B0 to B4. For example, one proximity sensor may detect an object at two or more detection points. Alternatively, as illustrated in FIG. 10, the sensor 4 may include one light emitting element 41*a* and a plurality of light receiving elements 42*a*, 42*b*, and 42*c* corresponding to the light emitting element 41*a*. The light from the light emitting element 41*a* is branched into a plurality of emitted lights by the optical coupler 43. The plurality of emitted lights correspond to the plurality of detection points. For example, in FIG. 10, the plurality of emitted lights correspond to the reference detection point B10, the first detection point B11, and the second detection point B12. Although not illustrated, the optical coupler 43 may further branch the light from the light emitting element 41 into a plurality of emitted lights corresponding to the third detection point B13 and the fourth detection point B14. Alternatively, the sensor 4 may further include a light emitting element and a light receiving element corresponding to the third detection point B13 and the fourth detection point B14.

Based on the output from the sensor 4, the controller 5 acquires a trajectory of a plurality of positions where the object is detected as the input parameter. The controller 5 identifies the moving direction of the object from the trajectory of the plurality of positions where the object is detected. For example, as illustrated in FIG. 8, the input parameters include an upward movement C11, a downward movement C12, a right movement C13, and a left movement C14. The upward movement C11 indicates that the moving direction of the object is upward. The downward movement C12 indicates that the moving direction of the object is downward. The right movement C13 indicates that the moving direction of the object is to the right. Left movement C14 indicates that the moving direction of the object is to the left.

In FIG. 8, the movement from the reference detection point B10 to the first detection point B11 is illustrated as the upward movement C11. As the downward movement C12, the movement from the reference detection point B10 to the second detection point B12 is illustrated. As the right movement C13, the movement from the reference detection point B10 to the third detection point B13 is illustrated. As the left movement C14, the movement from the reference detection point B10 to the fourth detection point B14 is illustrated.

However, the upward movement C11 may be a movement from the second detection point B12 to the reference detection point B10 or the first detection point B11. The downward movement C12 may be a movement from the first detection point B11 to the reference detection point B10 or the second detection point B12. The right movement C13 may be a movement from the fourth detection point B14 to the reference detection point B10 or the third detection point B13. The left movement C14 may be a movement from the third detection point B13 to the reference detection point B10 or the fourth detection point B14.

The controller 5 outputs a signal corresponding to the identified input pattern. The controller 5 turns off the signal from the signal output device 6 when no object is detected. When the input pattern is the upward movement C11, the controller 5 outputs the signal of the first command value from the signal output device 6. When the input pattern is the downward movement C12, the controller 5 outputs the signal of the second command value from the signal output device 6. When the input pattern is the right movement C13, the signal of the third command value is output from the signal output device 6. When the input pattern is left movement C14, the signal of the fourth command value is output from the signal output device 6.

The first command value is a value corresponding to the upward movement C11. The second command value is a value corresponding to the downward movement C12. The third command value is a value corresponding to the right movement C13. The fourth command value is a value corresponding to the left movement C14. The first to fourth command values are different from each other. The controller 5 may output a signal having a command value that continuously increases or decreases as the moving distance increases in each of the up, down, left, and right directions.

Figure 11A:
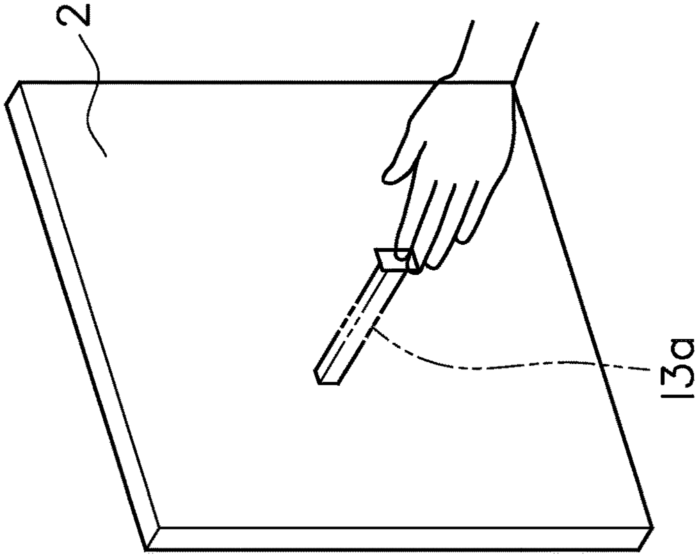
FIGS. 11A, 11B, and 11C are diagrams showing an example of the change of the image according to the input pattern.
Figure 11B:
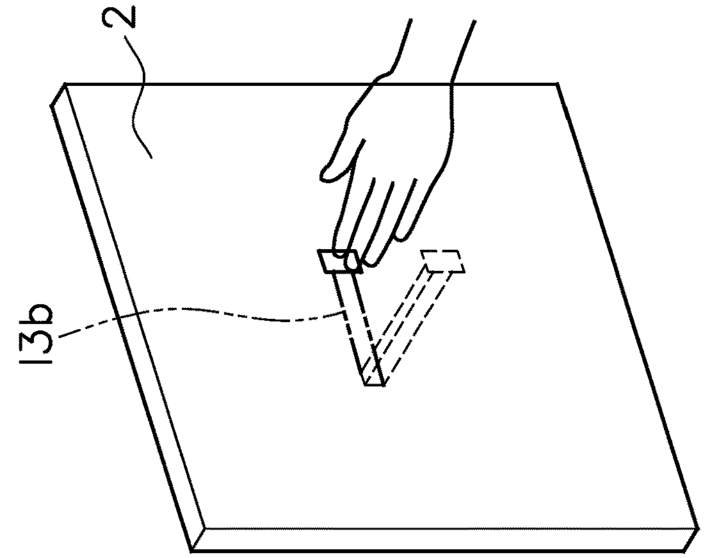
Figure 11C:
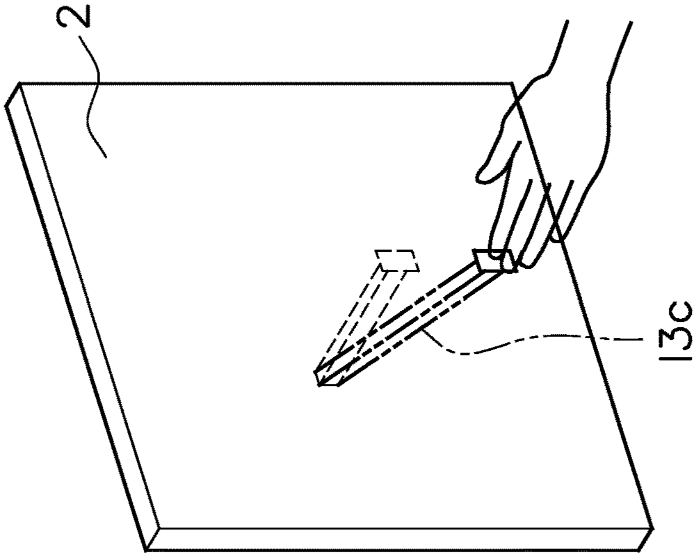

The controller 5 moves the image according to the input pattern. That is, the controller 5 moves the image in the direction corresponding to the moving direction of the object. For example, as shown in FIGS. 11A, 11B and 11C and FIGS. 12A, 12B and 12C, the image displayed by the light guide plate 2 is a stereoscopic image showing a lever-shaped input member operated by an operator. As shown in FIGS. 11A, 11B and 11C, the controller 5 switches the image from a first image I3*a* to a second image I3*b* or a third image I3*c* according to the input pattern. When no input operation is performed, the controller 5 displays the first image I3*a* shown in FIG. 11A. The first image I3*a* is an image corresponding to no operation. The first image I3*a* shows the input member in the neutral position. When the input pattern is the upward movement C11, the controller 5 displays the second image I3*b* shown in FIG. 11B. The second image I3*b* is an image corresponding to the upward movement C11. In the second image I3*b*, the input member is located above the first image I3*a*. When the input pattern is downward movement C12, the controller 5 displays the third image I3*c* shown in FIG. 11C. The third image I3*c* is an image corresponding to the downward movement C12. In the third image I3*c*, the input member is located below the first image I3*a*.

Figure 12C:
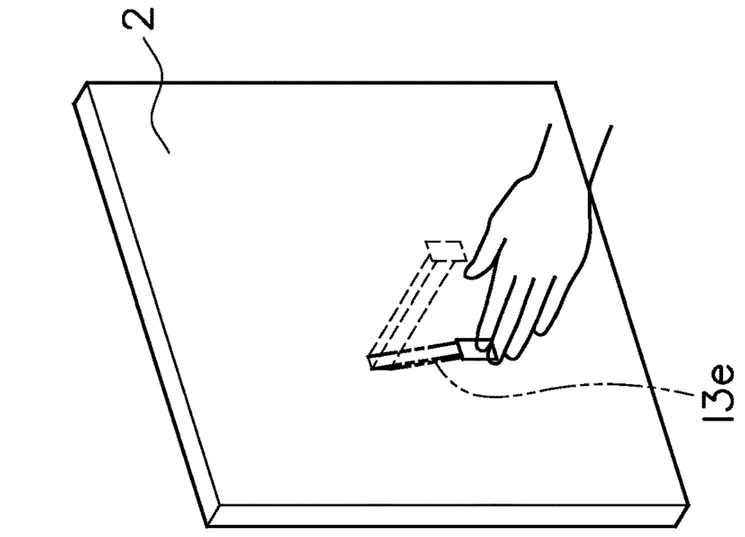
FIGS. 12A, 12B, and 12C are diagrams showing another example of the change of the image according to the input pattern.
Figure 12B:
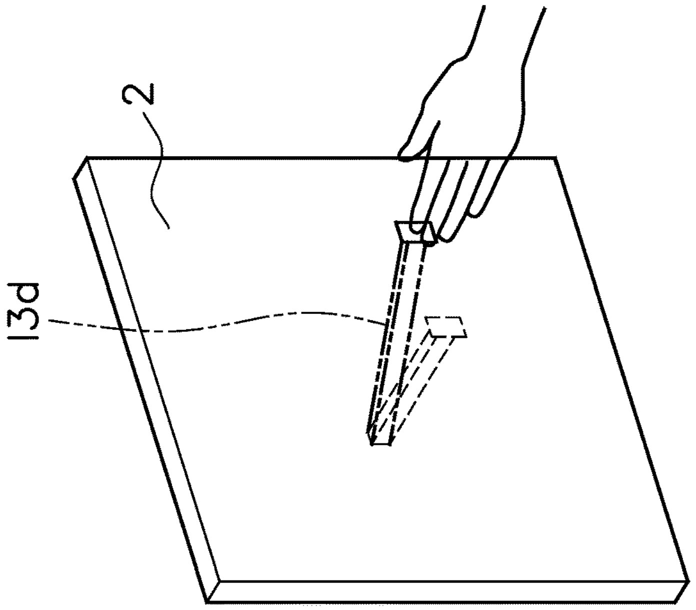
Figure 12A:
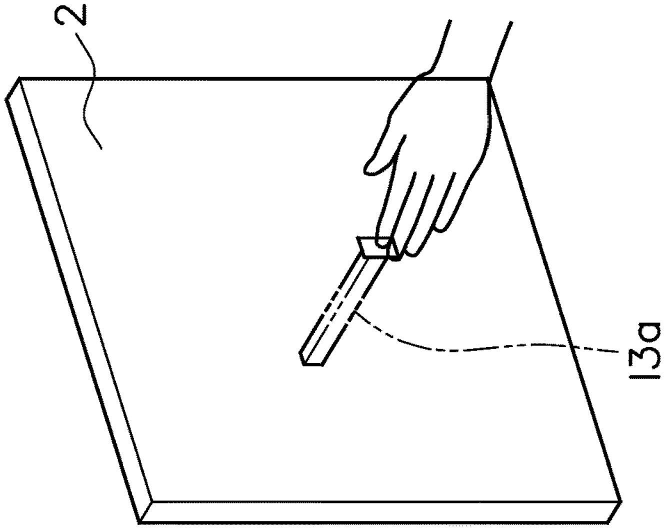

As shown in FIGS. 12A, 12B and 12C, the controller 5 switches the image from the first image I3*a* to a fourth image I3*d* or a fifth image I3*e* according to the input pattern. When the input pattern is the right movement C13, the controller 5 displays the fourth image I3*d* shown in FIG. 12B. The fourth image I3*d* is an image corresponding to the right movement C13. In the fourth image I3*d*, the input member is located rightward of the first image I3*a*. When the input pattern is left movement C14, the controller 5 displays the fifth image I3*e* shown in FIG. 12C. The fifth image I3*e* is an image corresponding to the left movement C14. In the fifth image I3*e*, the input member is located leftward of the first image I3*a*.

For example, the input device 1 may include a plurality of light sources corresponding to the first to fifth images I3*a* to I3*e*. Alternatively, the input device 1 may include a plurality of light sources and a plurality of light guide plates corresponding to the first to fifth images I3*a* to I3*e*. The controller 5 may switch the display of the first to fifth images I3*a* to I3*e* by selectively turning on the plurality of light sources.

In the input device 1 according to the third embodiment described above, the controller 5 can identify the input pattern according to the direction of the input operation by the user. For example, the controller 5 can identify the input pattern according to the movement direction of the user's finger.

The controller 5 moves the image in a direction corresponding to the moving direction of the object. Therefore, the image changes according to the direction of the user's input operation. Therefore, the user can easily grasp that the input device 1 recognizes his/her own input operation.

Figure 13:
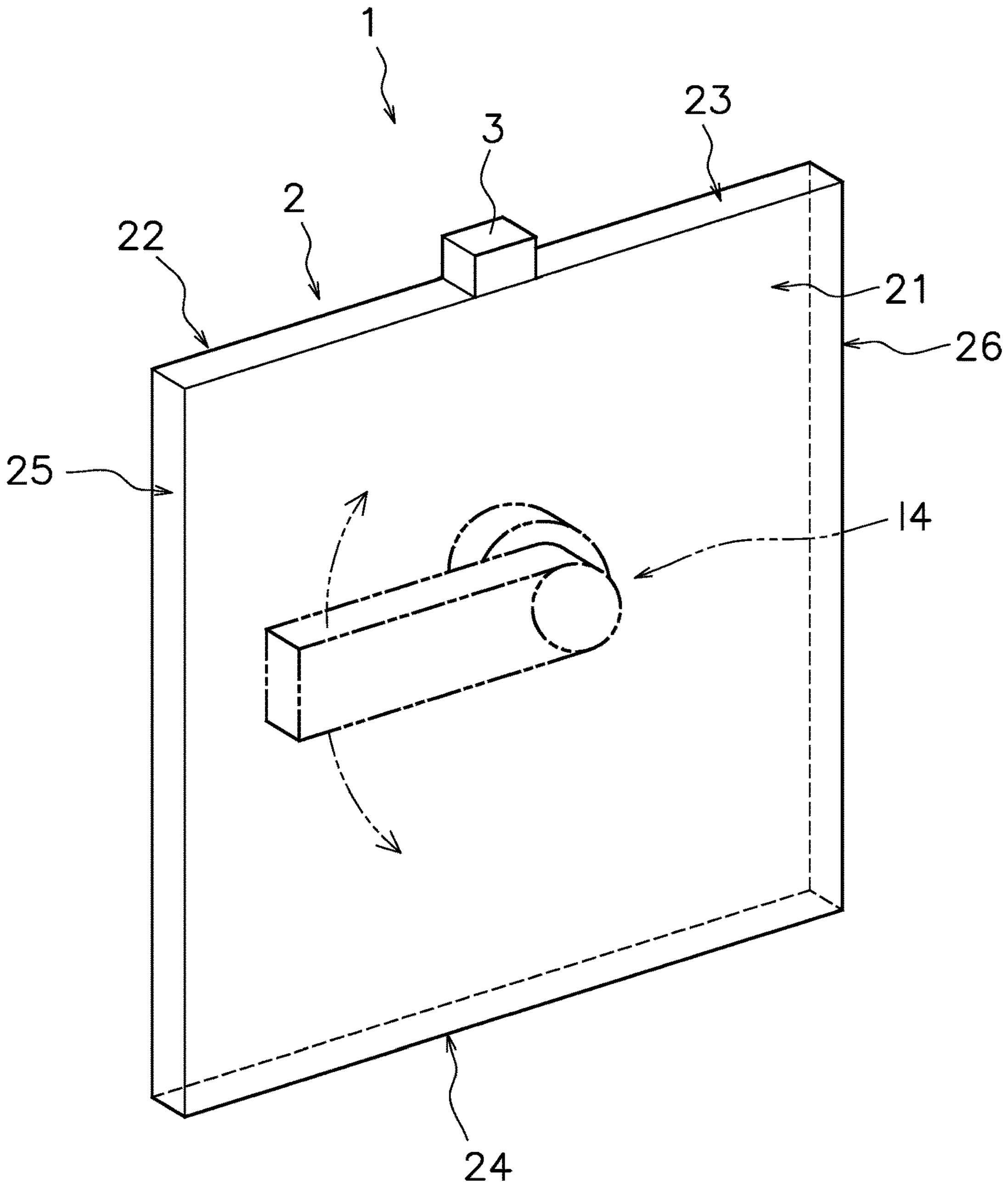
FIG. 13 is a diagram showing another example of the image.
Figure 14:
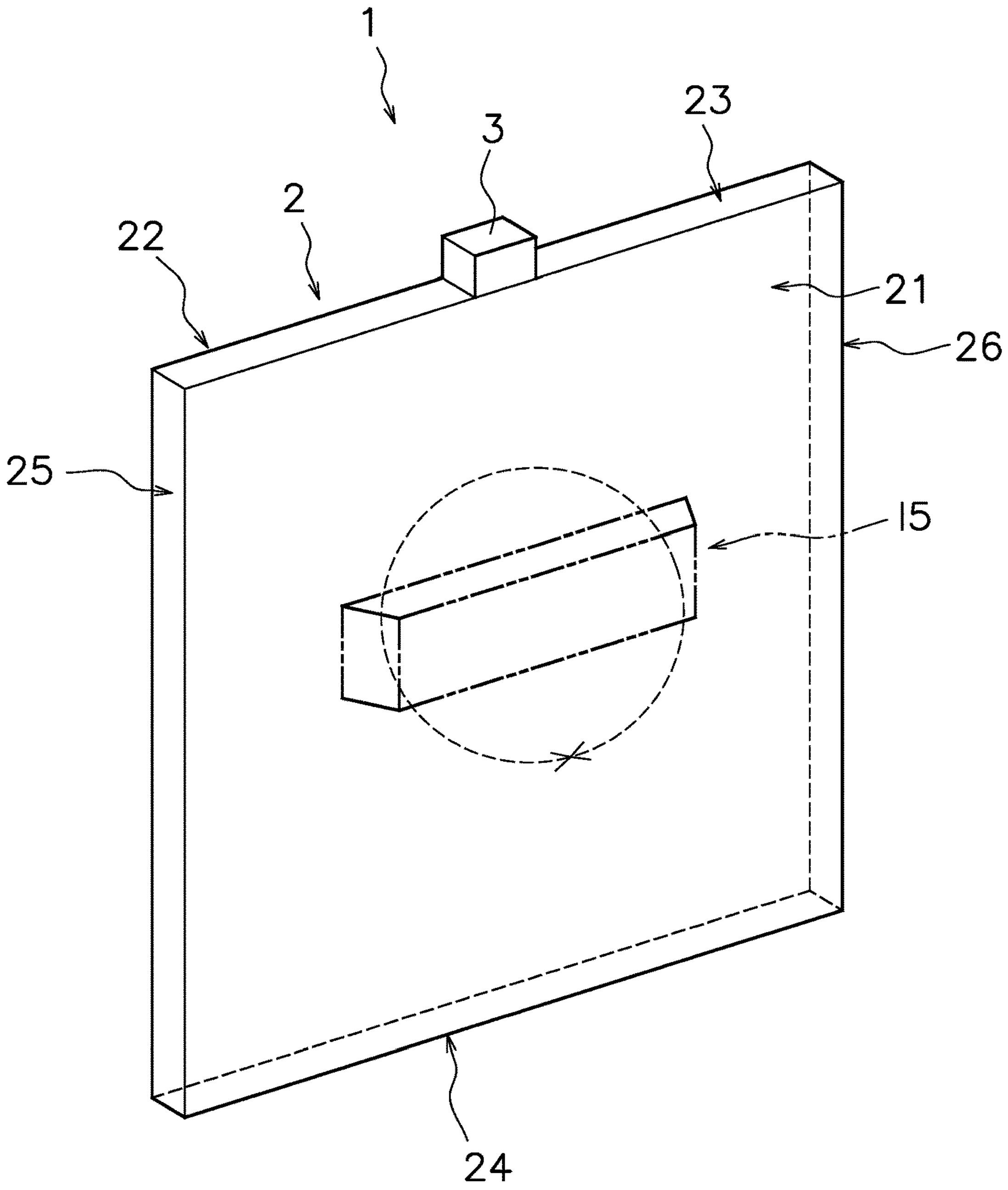
FIG. 14 is a diagram showing another example of the image.

The moving direction of the object identified by the controller 5 may be only up and down. The moving direction of the object identified by the controller 5 may be only left and right. The moving direction of the object identified by the controller 5 is not limited to the four directions of up, down, left and right, and may be eight or more directions including between the up, down, left and right. Alternatively, the moving direction of the object identified by the controller 5 is not limited to up, down, left, and right, and may be another direction. For example, as shown in FIGS. 13 and 14, the controller 5 may identify rotation directions such as clockwise and counterclockwise as the movement direction. The controller 5 may identify the rotation angle. The controller 5 may output a signal having a command value according to the rotation direction and/or the rotation angle.

Figure 15:
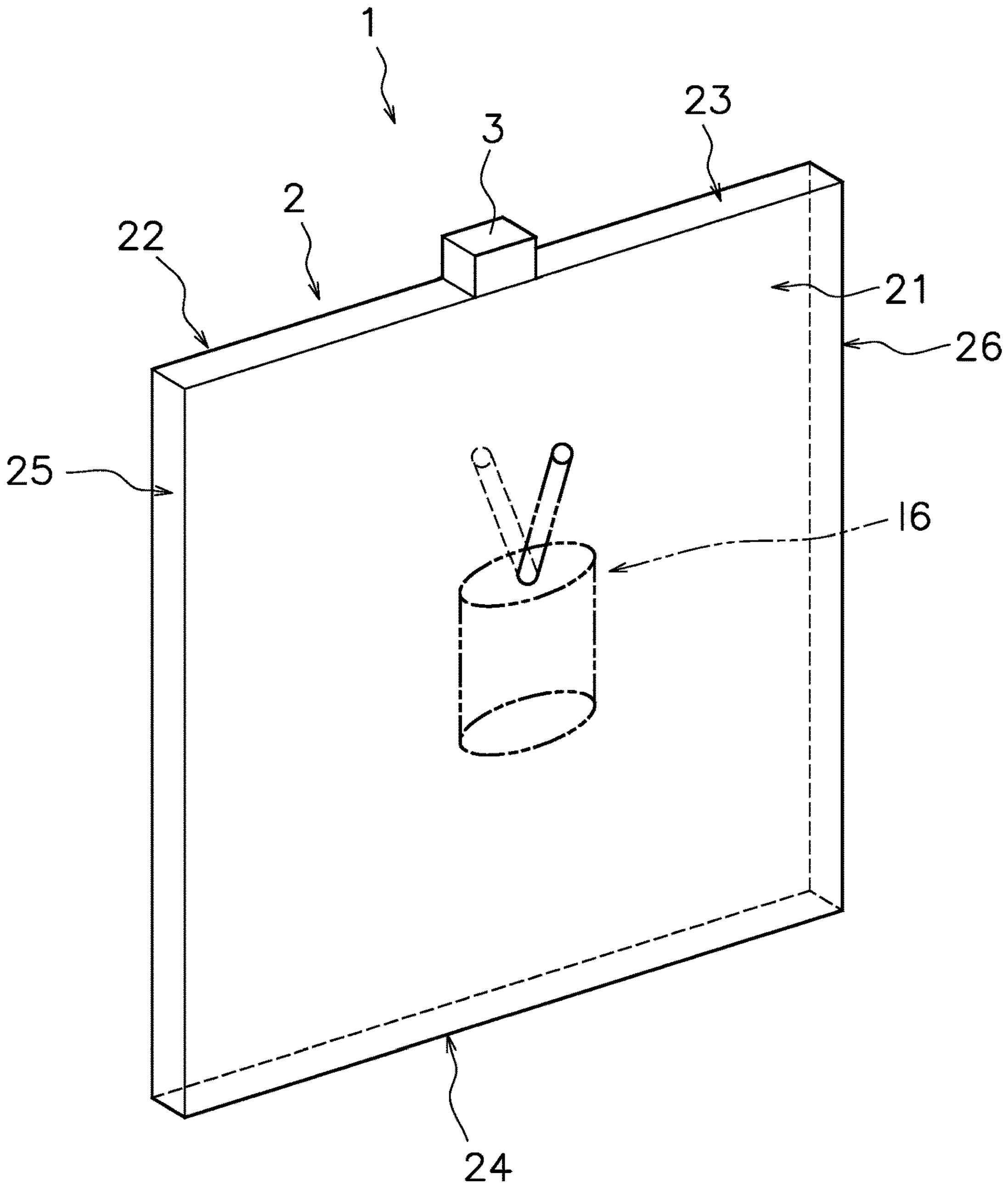
FIG. 15 is a diagram showing another example of the image.

The image displayed by the light guide plate 2 is not limited to the shape of the lever, and may have other shapes. For example, as shown in FIG. 13 or 14, the light guide plate 2 may display knob-shaped images 14 and I5. Alternatively, as shown in FIG. 15, the light guide plate 2 may display a toggle switch-shaped image 16.

Although one embodiment of the present invention has been described above, the present invention is not limited to the above embodiment, and various modifications can be made without departing from the gist of the invention.

The image displayed by the light guide plate 2 is not limited to that of the above embodiment, and may be changed. Alternatively, the light guide plate 2 may display a combination of the images of the above-described embodiments. The controller 5 may change the color or brightness of the image according to the input pattern. The input device 1 may include an audio output device such as a speaker or a buzzer. The controller 5 may change the timbre, scale, voice, melody, or the like according to the input pattern. The controller 5 may change any combination of images, colors, brightness, sounds, and the like according to the input pattern.

Figure 16:
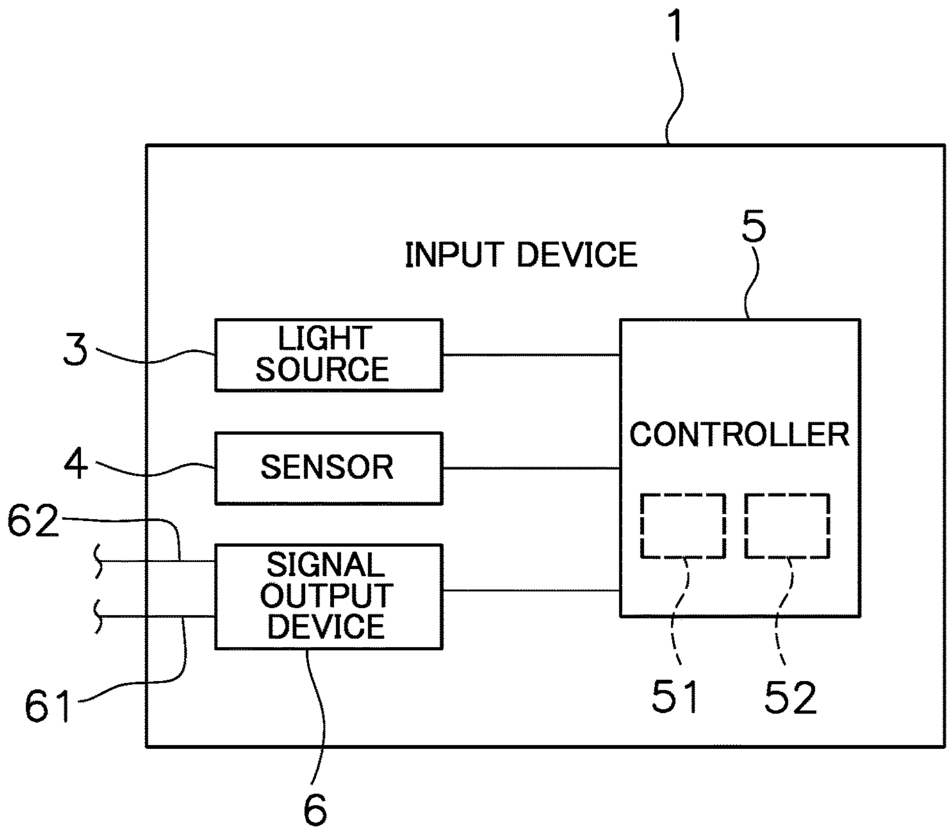
FIG. 16 is a block diagram showing the structure of the input device according to another embodiment.

As illustrated in FIG. 16, the input device 1 may include a plurality of signal lines 61 and 62 for outputting a signal to the outside of the input device 1. The controller 5 may selectively output the signal from the plurality of signal lines 61 and 62 according to the input pattern. For example, the plurality of signal lines 61 and 62 include a first signal line 61 and a second signal line 62. The controller 5 may output a signal from the first signal line 61 when the input pattern is the normal pressing operation. The controller 5 may output a signal from the second signal line 62 when the input pattern is the long press operation. Alternatively, the controller 5 may output a signal from the first signal line 61 when the input pattern is the single click. The controller 5 may output a signal from the second signal line 62 when the input pattern is the double click.

Alternatively, the controller 5 may output a signal from the first signal line 61 when the input pattern is the upward movement C11. The controller 5 may output a signal from the second signal line 62 when the input pattern is the downward movement C12. Alternatively, the controller 5 may output a signal from the first signal line 61 when the input pattern is the right movement C13. The controller 5 may output a signal from the second signal line 62 when the input pattern is the left movement C14. Alternatively, the input device 1 may include a plurality of signal lines of four or more. The controller 5 may selectively output a signal from the plurality of signal lines according to the input patterns of the upward movement C11, the downward movement C12, the right movement C13, and the left movement C14.

Figure 17:
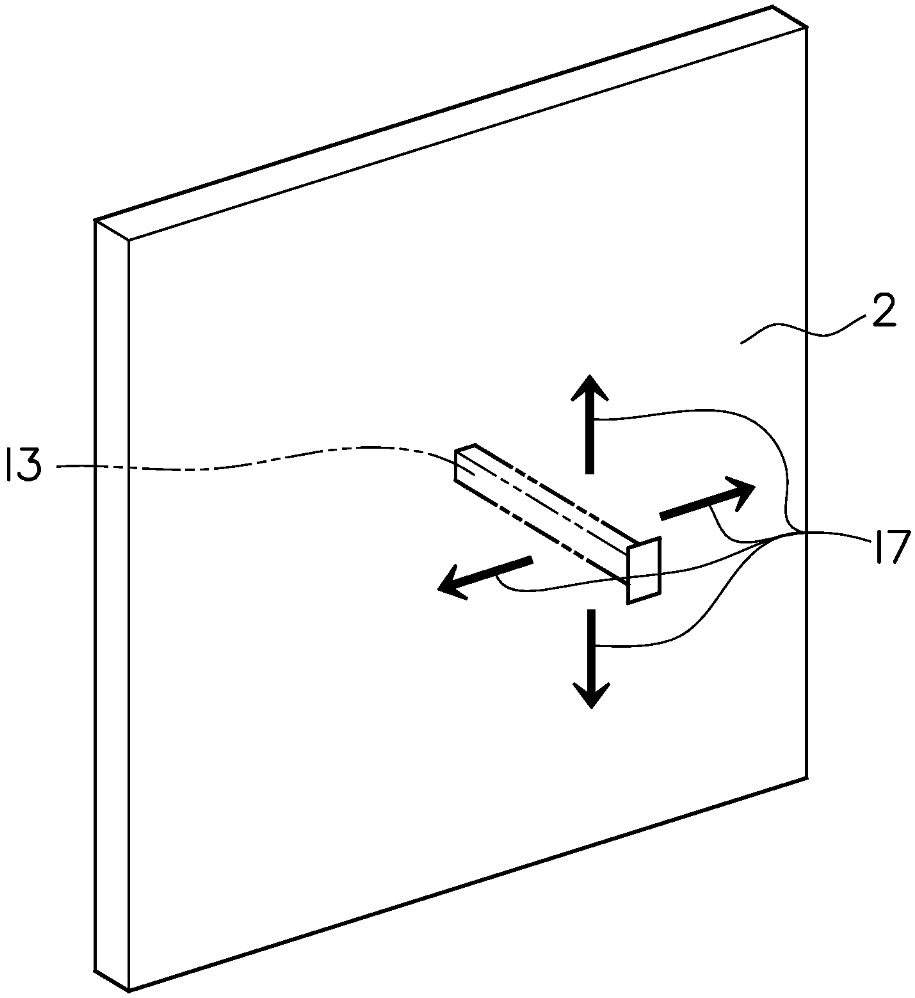
FIG. 17 is a diagram showing the image according to another embodiment.
Figure 18A:
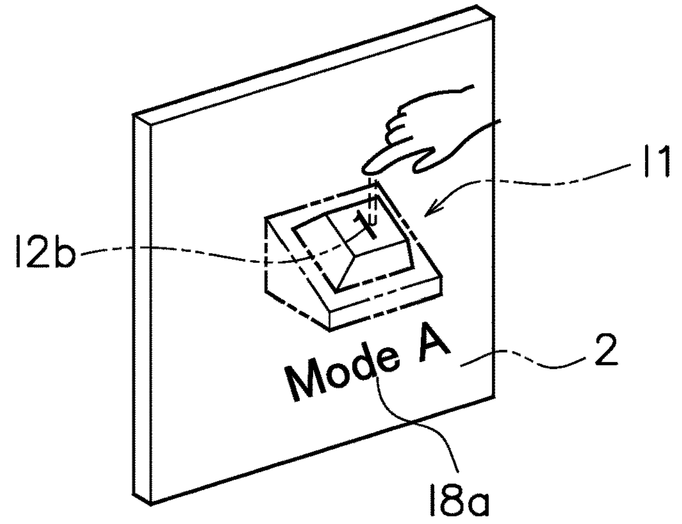
FIGS. 18A and 18B are diagrams showing the image according to another embodiment.
Figure 18B:
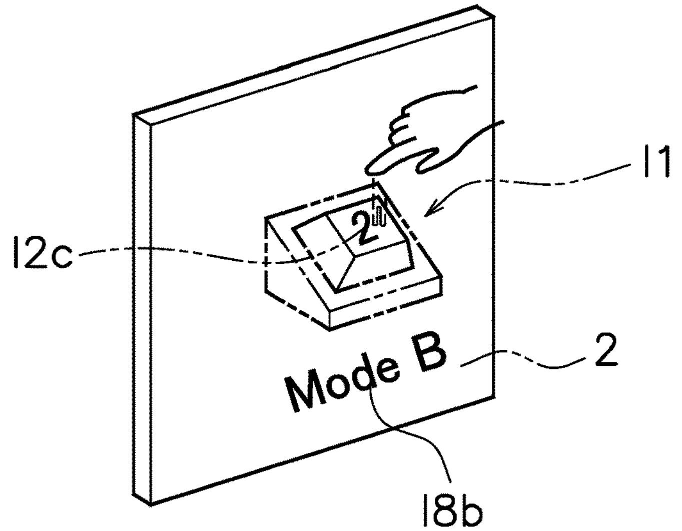

The light guide plate 2 may display an image showing the operation direction, the operation method, or the mode selected by the operation of the input member together with the image showing the input member. For example, as illustrated in FIG. 17, the light guide plate 2 may display an image 17 showing an operation direction of the input member together with an image I3 showing the input member. In the example illustrated in FIG. 17, the image 17 shows arrows corresponding to upward movement, downward movement, right movement, and left movement. Alternatively, as illustrated in FIGS. 18A and 18B, the light guide plate 2 may display images I8*a* and I8*b* showing the mode selected by the operation together with the image I1 showing the input member. For example, the image I8*a* shows a mode (mode A) selected by the single click. Image I8*b* shows a mode (mode B) selected by the double click.

The input device 1 described above can be applied to, for example, a hot water washing toilet seat, a bathroom vanity, a faucet, a range hood, a dishwasher, a refrigerator, a microwave oven, an IH cooking heater, an electrolytic water generator, an elevator, an interphone, a lighting, a door opening/closing device, a television, a stereo system, an air conditioner, a washing machine, a ticket issuing machine, a ticket vending machine, or the like.

By applying the above-mentioned input device 1 to these devices, following advantages can be obtained. It is easy to clean because the input device 1 has no unevenness. The design can be improved because a stereoscopic image can be displayed only when necessary. It is hygienic because it can be operated without contacting the input device 1. It is hard to break because there are no moving parts. Alternatively, the above-mentioned input device 1 can be applied to a device such as an ATM (automated teller machine) or a credit card reader. By applying the above-mentioned input device 1 to these devices, no trace of input such as hand stains, fingerprints, or body temperature remains on the input device 1. As a result, security can be improved.

REFERENCE SIGNS LIST

3 Light source
2 Light guide plate
4 Sensor
5 Controller
61 Signal line

The invention claimed is:

1. An input device, comprising:
- a light source;
- a light guide plate configured to guide light from the light source to form an image of an input member in a region of space in front of the light guide plate;
- a sensor configured to detect an object in the region of space; and
- a controller configured to
  - acquire, as an input parameter, at least one of a trajectory of a plurality of positions where the object is detected, a duration time of detecting the object, and a number of times the object is detected based on an output from the sensor,
  - identify, based on the input parameter, an input pattern representing a three-dimensional manipulation of the input member according to a movement of the object within the region of space,
  - output a signal corresponding to the identified input pattern, and
  - vary the image of the input member based on the signal and in accordance with the identified input pattern.

2. The input device according to claim 1, wherein the controller is configured to acquire the trajectory of the plurality of positions where the object is detected and the controller is further configured to identify a moving direction of the object from the trajectory of the plurality of positions where the object is detected, the input pattern including the moving direction of the object.

3. The input device according to claim 2, wherein the sensor is further configured to detect the object at least at a reference detection point in the input member image, a first detection point located above the reference detection point, and a second detection point located below the reference detection point.

4. The input device according to claim 2, wherein the sensor is further configured to detect the object at least at a reference detection point in the input member image, a third detection point located leftward of the reference detection point, and a fourth detection point located rightward of the reference detection point.

5. The input device according to claim 2, wherein the controller is further configured to move the input member image in a direction corresponding to the moving direction of the object.

6. The input device according to claim 1, wherein the controller is configured to acquire the duration time of detecting the object as the input parameter and is further configured to identify the input pattern according to the duration time, the signal being output according to the duration time.

7. The input device according to claim 6, wherein the controller is further configured to change the input member image according to the duration time.

8. The input device according to claim 1, wherein the controller is further configured to acquire the number of times the object is detected within a predetermined time and to output the signal according to the number of times the object is detected within the predetermined time.

9. The input device according to claim 8, wherein the controller is further configured to change the input member image according to the number of times the object is detected within the predetermined time.

10. The input device according to claim 8, wherein the controller is further configured to discriminate between a single click and a double click according to the number of times the object is detected within the predetermined time.

11. The input device according to claim 1, wherein the sensor includes a photoelectric sensor.

12. The input device according to claim 1, wherein the controller is further configured to output the signal according to the input pattern such that the signal has a plurality of command values.

13. The input device according to claim 1, further comprising a plurality of signal lines configured to output the signal to an outside of the input device the controller being further configured to selectively output the signal from the plurality of signal lines according to the input pattern.

14. The input device according to claim 1, wherein the controller is configured to identify between a normal press operation and a long press operation according to the duration time; display a first image corresponding to no input operation as the input member image when no input operation is performed; display a second image corresponding to the normal press operation as the input member image when the normal press operation is performed; and display a third image corresponding to the long press operation as the input member image when the long press operation is performed; and wherein the input member image includes a base portion and a button portion protruding from the base portion; an amount of protrusion of the button portion from the base portion in the second image is smaller than that in the first image; and the amount of protrusion of the button portion from the base portion in the third image is smaller than that in the second image.

15. An input device, comprising:

a light source;

a light guide plate configured to guide light from the light source to form an image of an input member in a region of space in front of the light guide plate;

a sensor configured to detect an object in the region of space; and a controller configured to acquire, as an input parameter, at least one of a trajectory of a plurality of positions where the object is detected, a duration time of detecting the object, and a number of times the object is detected based on an output from the sensor, identify, based on the input parameter, an input pattern representing a three-dimensional manipulation of the input member according to a movement of the object within the region of space, output a signal corresponding to the identified input pattern, and vary the image of the input member based on the signal and in accordance with the identified input pattern, wherein the light guide plate is configured to form the image of the input member as a stereoscopic image, the light guide plate includes a plurality of light guide portions and an emitting surface that emits light from the light source, the plurality of light guide portions are provided corresponding to a plurality of prescribed points included in the stereoscopic image of the input member, each of the plurality of light guide portions includes a plurality of prisms, and the plurality of prisms are arranged so that the light from the light source is reflected toward the emitting surface of the light guide plate and the light converges at the plurality of prescribed points corresponding to each of the plurality of light guide portions.

16. An input device, comprising:

a light source;

a light guide plate configured to guide light from the light source to form an image of an input member in a region of space in front of the light guide plate;

a sensor configured to detect an object in the region of space; and a controller configured to acquire, as an input parameter, at least one of a trajectory of a plurality of positions where the object is detected, a duration time of detecting the object, and a number of times the object is detected based on an output from the sensor, identify, based on the input parameter, an input pattern representing a three-dimensional manipulation of the input member according to a movement of the object within the region of space, output a signal corresponding to the identified input pattern, and vary the image of the input member based on the signal and in accordance with the identified input pattern, wherein the light guide plate comprises one or more light guide plate components and the light source comprises one or more lighting elements arranged to introduce light into respective ones of the light guide plate components, each of the light guide plate components including a plurality of light guide portions with a plurality of reflection members configured and arranged to reflect light from the one or more lighting elements that is internally reflected within a given light guide plate components and out of the light guide plate member via an emitting surface, the reflection members being configured and arranged to cause light emitted via the emitting surface to converge at predetermined points in the region of space to create a stereoscopic, virtual image of the input member.

* * * * *